United States Patent [19]
Sogabe et al.

[11] Patent Number: 6,018,606
[45] Date of Patent: *Jan. 25, 2000

[54] FIBER FIXING DEVICE FOR LINEAR LIGHTGUIDE

[75] Inventors: Kazuki Sogabe; Hideya Konda; Toshihiro Nakae, all of Osaka; Mitsuyoshi Suzuki, Kanagawa, all of Japan

[73] Assignees: Sumitomo Electric Industries, Ltd., Osaka; Koken Co., Ltd., Yokohama, both of Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/825,197

[22] Filed: Mar. 27, 1997

[30] Foreign Application Priority Data

Jul. 15, 1996 [JP] Japan ................... 8-184986

[51] Int. Cl.[7] ........................................ G02B 6/36
[52] U.S. Cl. .................. 385/136; 385/134; 385/137; 385/139; 385/60
[58] Field of Search .................... 385/134, 136, 385/60, 62, 66, 70, 81, 137, 78, 139

[56] References Cited

U.S. PATENT DOCUMENTS

| | | |
|---|---|---|
| 3,946,467 | 3/1976 | Lukas et al. . |
| 4,217,029 | 8/1980 | Kao ........................................... 385/64 |
| 4,435,036 | 3/1984 | Sasakawa . |
| 4,443,700 | 4/1984 | Macedo et al. ............................ 385/13 |
| 4,448,482 | 5/1984 | Lathlaen ..................................... 385/64 |
| 4,573,760 | 3/1986 | Fan et al. .................................. 385/85 |
| 4,781,430 | 11/1988 | Tanaka . |
| 4,813,760 | 3/1989 | Tanaka et al. . |
| 4,848,870 | 7/1989 | Wisecarver et al. . |
| 4,850,671 | 7/1989 | Finzel . |
| 4,902,090 | 2/1990 | Tanaka . |
| 4,989,943 | 2/1991 | Yoshinaga et al. ....................... 385/33 |
| 5,052,768 | 10/1991 | Matumoto et al. . |
| 5,097,523 | 3/1992 | Marie ........................................ 385/59 |
| 5,179,608 | 1/1993 | Ziebol et al. . |
| 5,185,837 | 2/1993 | Ayuta et al. .............................. 385/81 |
| 5,394,496 | 2/1995 | Caldwell et al. . |
| 5,418,874 | 5/1995 | Carlisle et al. ........................... 385/76 |
| 5,661,834 | 8/1997 | Watanabe et al. ........................ 385/92 |

FOREIGN PATENT DOCUMENTS

| | | |
|---|---|---|
| 0026553 | 4/1981 | European Pat. Off. . |
| 0392555 | 10/1990 | European Pat. Off. . |
| 94 06 950 U | 10/1994 | Germany . |
| 61-099110 | 5/1986 | Japan . |
| 63-030807 | 2/1988 | Japan . |
| 1-185603 | 7/1989 | Japan . |
| 1185603 | 7/1989 | Japan ...................................... 385/136 |
| 9219998 | 11/1992 | Japan . |
| 6-059135 | 3/1994 | Japan . |
| 9606373 | 2/1996 | Japan . |
| 1511988 | 5/1978 | United Kingdom . |
| 2060197 | 4/1981 | United Kingdom . |
| WO9219998 | 11/1992 | WIPO . |
| WO96/06373 | 2/1996 | WIPO . |

*Primary Examiner*—Rodney Bovernick
*Assistant Examiner*—Ellen E. Kang
*Attorney, Agent, or Firm*—W. F. Fasse; W. G. Fasse

[57] ABSTRACT

A fiber fixing device for a linear lightguide comprises a tubular chuck and an elastic tubular body. The chuck includes a hollow part along its axis for receiving an optical fiber, a grasp part for grasping the received optical fiber, and a coupling part supporting the grasp part. The elastic tubular body is elastically expanded outwardly in the radial direction and in this state is fitted onto the grasp part of the chuck. Thus, the elastic tubular body exerts an elastic restoring force to radially inwardly press the grasp part which thereby grasps the optical fiber.

24 Claims, 6 Drawing Sheets

FIBER FIXING DEVICE FOR LINEAR LIGHTGUIDE

BACKGROUND OF THE INVENTION

1. Field of the Invention

The present invention generally relates to a fiber fixing device for a linear lightguide such as an optical connector, and more particularly, it relates to a fiber fixing device for a linear lightguide which is so improved as to elastically retain an optical fiber.

2. Description of the Background Art

Optical fiber has a function of transmitting information. Referring to FIG. 1, this optical fiber is an innovative medium fundamentally changing the communication system, which has transmitted sounds as electrical signals or electrical conductors for ages. It is not too much to say that the advanced information-oriented society has been started with the appearance of this high technology.

A fiber strand or filament which is made of fused quartz, multicomponent glass or transparent synthetic resin, for example, is employed for a linear lightguide such as optical fiber. The fiber strand or filament, which is extremely thin and breakable in general, is protected by a flexible coating of synthetic resin. In case of forming an optical transmission path with such a linear lightguide, a fiber fixing device such as a connector is mounted on each end portion of the linear lightguide as shown in FIG. 1, for protecting the linear lightguide and locating the optical axis.

In general, various structures that achieve fixing with an adhesive, fixing by mechanical clamping and the like are proposed in relation to the fiber fixing device for a linear lightguide.

FIG. 2 illustrates a fiber fixing device for a linear lightguide employing an adhesive. Referring to FIG. 2, an optical fiber member 102 is formed by a fiber filament 100 and a protective coating 101. This optical fiber member 102 is inserted in a metal fiber guide 103. A clearance between the optical fiber member 102 and the fiber guide 103 is filled up with an adhesive 104. The adhesive 104 is so hardened as to locate and fix the optical fiber member 102 in the fiber guide 103.

FIGS. 3 and 4 are adapted to illustrate a fixing method by mechanical clamping. According to this method, an optical fiber member 102 is inserted in a metal tubular body 105 having a larger diameter, and this tubular body 105 is pressed or crimped by vertically movable parts of a pressing tool 106a and 106b from above and below. Thus, the tubular body 105 retains the optical fiber member 102 with constant force.

Problems of the conventional fiber fixing device for a linear lightguide are now described.

In each of the aforementioned fiber fixing devices, the optical fiber member is directly fixed with an adhesive or a metal tubular body, and hence internal stress is caused in the optical fiber member due to a difference in expansion and contraction resulting from a difference in thermal expansion coefficient between the optical fiber member and the adhesive or the metal tubular body, or due to dimensional dispersion, to disadvantageously hinder the optical characteristics or shorten the life of the optical fiber member.

Further, a fiber fixing device which is tested after fixing a linear lightguide, whereby the assembly is determined to be defective, cannot be disassembled to be reused for re-assembling. Thus, the production yield is uneconomically deteriorated.

In addition, the method of fixing the linear lightguide with an adhesive is inferior in productivity due to the long time required for drying the adhesive.

In the method of directly pressing the optical fiber member, on the other hand, the optical fiber member is disadvantageously stressed or broken if the pressing force is too strong. If the pressing force is too weak, on the other hand, the optical fiber member can slip out of the fiber fixing device after assembling. Thus, the pressing force must be strictly controlled.

SUMMARY OF THE INVENTION

Accordingly, an object of the present invention is to provide a fiber fixing device for a linear lightguide, which is so improved that no excessive stress is caused in an optical fiber following environmental change such as temperature change.

Another object of the present invention is to provide a fiber fixing device for a linear lightguide which is so improved that no excessive stress is caused in an optical fiber member even if component dimensions are slightly dispersed or variable from one component to the next.

Still another object of the present invention is to provide a fiber fixing device for a linear lightguide which is easy to assemble.

A further object of the present invention is to provide a fiber fixing device for a linear lightguide which is excellent in productivity.

A further object of the present invention is to provide a fiber fixing device for a linear lightguide which is so improved that it can be re-assembled after it has been disassembled as as a result of a test showing a defect therein.

In order to attain the aforementioned objects, the fiber fixing device for a linear lightguide according to the present invention comprises a tubular chuck. This tubular chuck includes a hollow part which is provided along its axis for receiving an optical fiber, a grasp part for supporting the received optical fiber in a state holding the same, and a coupling part for coupling the grasp part. The fiber fixing device further comprises an elastic tubular body for grasping the optical fiber by radially inwardly pressing the grasp part of the chuck with its restoring force when it has been elastically expanded outwardly in the radial direction and fitted onto the grasp part of the chuck.

According to the inventive fiber fixing device for a linear lightguide, the elastic tubular body radially inwardly presses the grasp part with its restoring force when it has been elastically expanded outwardly in the radial direction and fitted onto the grasp part of the chuck, thereby grasping the optical fiber with the grasp part. Thus, internal stress is hardly caused in the optical fiber due to a difference in thermal expansion coefficient between an adhesive and the optical fiber or due to dimensional dispersion, dissimilarly to the conventional fiber fixing device that fixes the optical fiber member with an adhesive or by directly pressing the same. Consequently, the inventive fiber fixing device does not hinder or deteriorate the optical characteristics. Further, the inventive fiber fixing device does not decrease the life of the optical fiber.

If the inventive fiber fixing device is tested after fixing a linear lightguide, and the assembly is thereby determined to be defective, the elastic tubular body may be detached from the chuck so that the fiber fixing device can be reused for re-assembling. Consequently, the production yield is improved to attain an extremely economical effect.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are now described with reference to the drawings.

First Embodiment

FIGS. 5 to 8B are adapted to illustrate a fiber fixing device for a linear lightguide according to a first embodiment of the present invention.

Figure 1:
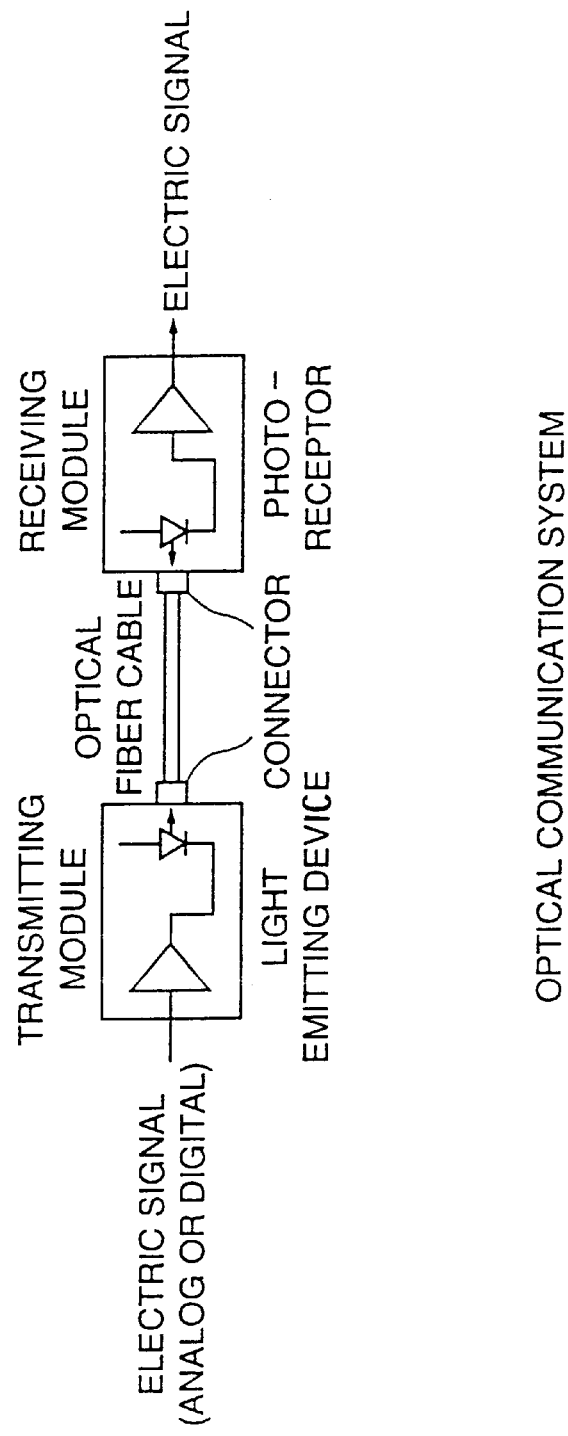
FIG. 1 is a conceptual diagram showing a conventional optical communication system.
Figure 2:
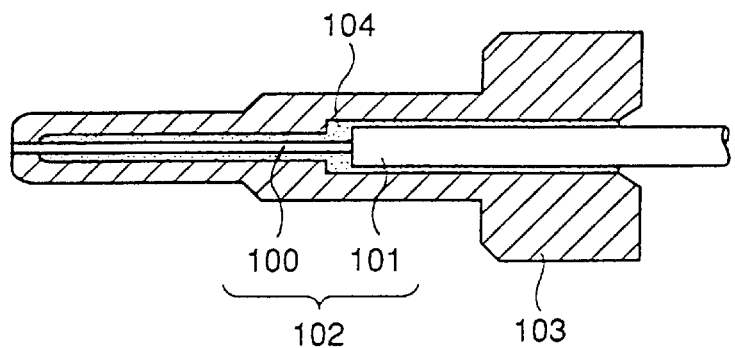
FIG. 2 is a sectional view showing a first conventional fiber fixing device.
Figure 3:
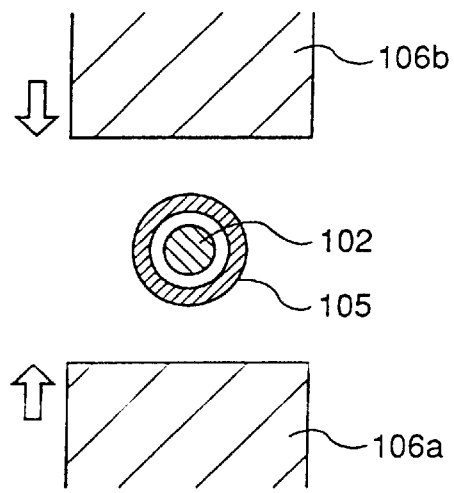
FIG. 3 is a sectional view showing a second conventional fiber fixing device.
Figure 4:
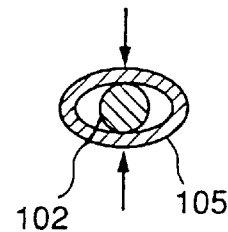
FIG. 4 is a sectional view showing an optical fiber part in the second conventional fiber fixing device retaining an optical fiber member.
Figure 5:
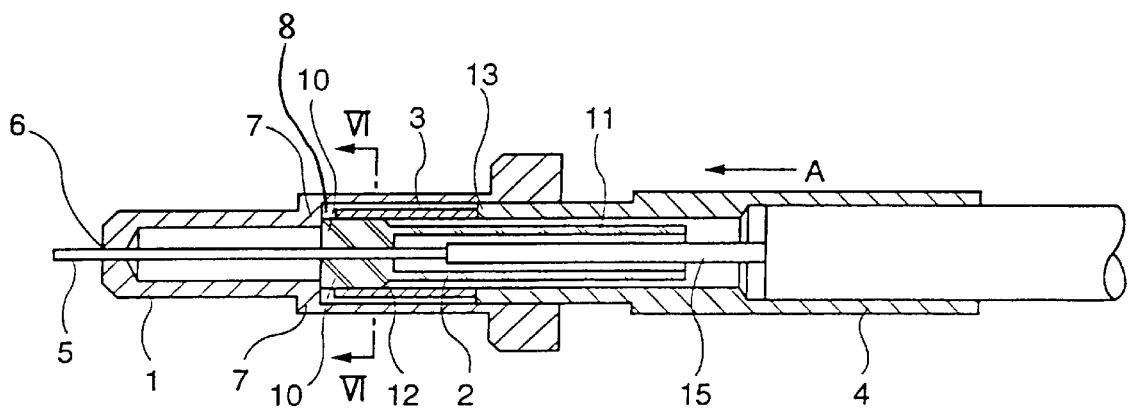
FIG. 5 is a sectional view showing a fiber fixing device according to a first embodiment of the present invention in a completely assembled state.

Referring to FIG. 5, the fiber fixing device for a linear lightguide according to the first embodiment of the present invention consists of a fiber guide 1, a chuck 2, an elastic tubular body 3 and a pressure pipe 4, which are made of metals or hard synthetic resin materials respectively.

The fiber guide 1 has a through hole 6, which is substantially identical in size to an optical fiber 5 as shown in FIG. 5, provided on a central portion of its forward end, a stepped stopper part 7 provided inside the same, and a store part 8 provided on the back of the stopper part 7 receiving therein the chuck 2, the elastic tubular body 3 and the like.

Figure 6:
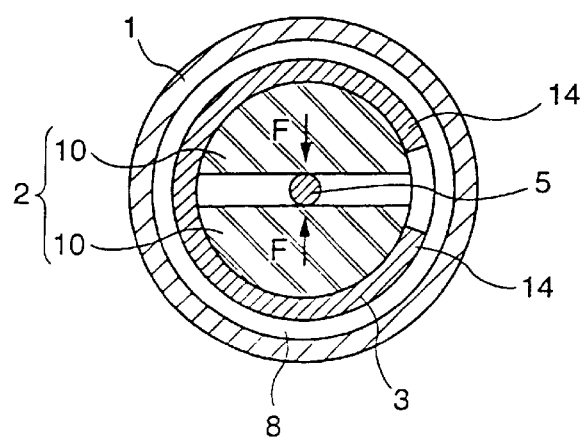
FIG. 6 is a sectional view taken along the line VI—VI in FIG. 5.
Figure 7:
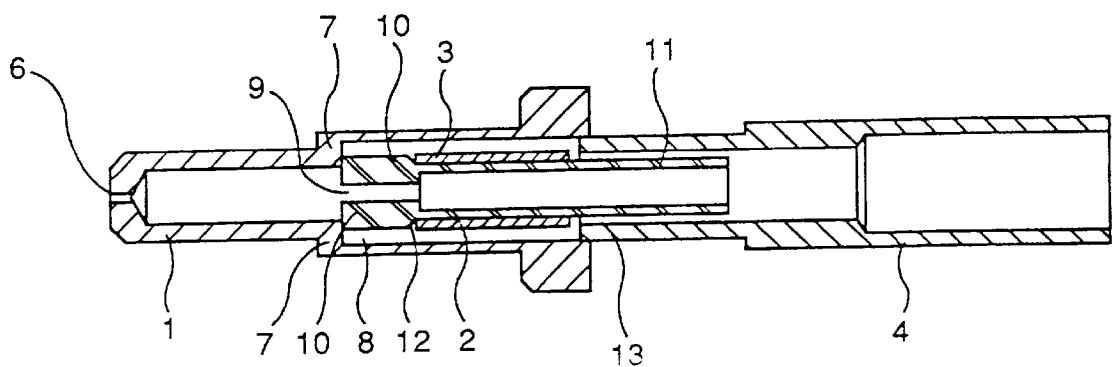
FIG. 7 is a sectional view showing the inventive fiber fixing device not yet receiving a linear lightguide.

Referring to FIG. 7, the chuck 2 is substantially cylindrical. This chuck 2 is provided with a slit 9 along the axial direction on its left side in the figure. This slit 9 defines a pair of grasp parts 10. Referring to FIG. 6, the sectional shapes of the pair of grasp parts 10 are substantially semicircular. Surfaces of the pair of grasp parts 10 which are opposed to each other are flat. The pair of grasp parts or shoulder 10 are coupled by a coupling part 11 having no slit 9. Inclined parts 12 are formed between the grasp parts 10 and, another portion of the chuck leading to the coupling part 11 respectively. The grasp parts 10 have a larger outer diameter than the other portion of the chuck leading to the coupling part 11, and the shoulders 12 slope between the two diameters, while the other portion of the chuck and the coupling part have the same outer diameter.

The pair of grasp parts 10 are adapted to grasp and support the optical fiber 5, which is received in the fiber fixing device, in a state holding the same therebetween.

As shown in FIG. 6, the section of the elastic tubular body 3 is substantially C-shaped. The resting or non-stressed inner diameter of this elastic tubular body 3 is rendered smaller than the resting or non-stressed outer diameter of the grasp portion (the pair of grasp parts 10). The inner diameter of the pressure pipe 4 is rendered slightly larger than the outer diameter of the coupling part 11. The forward end portion of the pressure pipe 4 defines a push-in part 13 for pushing the elastic tubular body 3.

A method of assembling the fiber fixing device according to the embodiment 1 is now described.

Figure 8A:
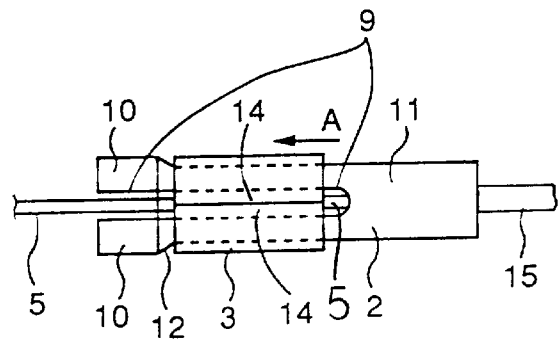
FIGS. 8A and 8B are sectional views for illustrating the action of an elastic tubular body employed for the inventive fiber fixing device.

Referring to FIGS. 7 and 8A, the elastic tubular body 3 is fitted onto the coupling part 11 of the chuck 2. At this time, the elastic tubular body 3 is smoothly inserted on the coupling part 11. Opposite edges 14 of the elastic tubular body 3 are in contact with or close to each other at this time. In this state, the pair of grasp parts 10 provided on the chuck 2 sufficiently separate from each other for receiving an optical fiber 5 therebetween.

Referring to FIG. 7, the chuck 2 and the elastic tubular body 3 are then inserted in the store part 8 of the fiber guide 1, for bringing the forward end portion of the chuck 2 into contact with the stopper part 7 of the fiber guide 1. At this time, the forward end portion of the pressure pipe 4 is fitted around the coupling part 11 of the chuck 2.

As shown in FIG. 5, the optical fiber 5 which is exposed by removal of a coating 15 is inserted in the fiber fixing device from behind the pressure pipe 4 and received in the hollow portion of the chuck 2 so that its forward end portion forwardly projects from the through hole 6 of the fiber guide 1. In this state, the pair of grasp parts 10 are sufficiently separate or spaced from each other as hereinabove described, whereby the optical fiber 5 can pass through the clearance therebetween.

Figure 8B:
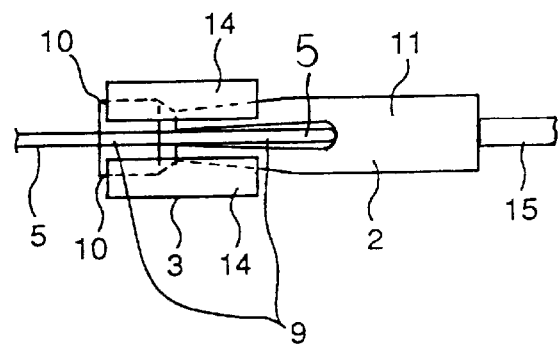

Thereafter the pressure pipe 4 is pushed along the direction of arrow A, as shown in FIG. 5. Thus, the push-in part 13 comes into contact with the rear end of the elastic tubular member 3, and accordingly moves the member 3 along the direction of arrow A. Referring to FIG. 8A, the elastic tubular body 3 passes over the inclined parts 12 of the chuck 2 and comes into contact with the pair of grasp parts 10, due to the aforementioned movement. At this time, the elastic tubular body 3 is elastically expanded outwardly in the radial direction. When the elastic tubular body 3 comes into contact with the pair of grasp parts 10, the two edges 14 thereof separate from each other, as shown in FIGS. 6 and 8B. When the pressure pipe 4 moves the elastic tubular body 3, the chuck 2 which is in contact with the stopper part 7 of the fiber guide 1 remains unmoved, whereby the elastic tubular body 3 reliably slides over and comes into contact with the grasp parts 10.

The pair of grasp parts 10 are inwardly pressed as shown in FIGS. 6 and 8b by the elastic restoring force of the elastic tubular body 3 following its deformation, for elastically grasping the optical fiber 5 therebetween by current pressing force F.

After the optical fiber 5 is retained in the aforementioned manner, a part of the optical fiber 5 projecting from the front surface of the fiber guide 1 is cut or abraded along the front surface, thereby completing the assembling.

Second Embodiment

Figure 9:
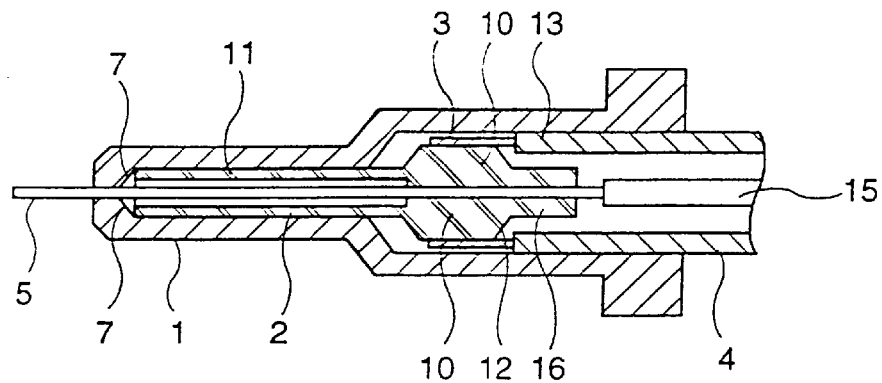
FIG. 9 is a sectional view showing a fiber fixing device according to a second embodiment of the present invention.

FIG. 9 is a sectional view showing a fiber fixing device according to a second embodiment of the present invention. Referring to FIG. 9, parts identical or corresponding to the members shown in FIG. 5 are denoted by the same reference numerals, to omit a redundant description. While the pair of grasp parts 10 of the chuck 2 are arranged facing toward the through hole 6 of the fiber guide 1 in the fiber fixing device according to the first embodiment, a coupling part 11 of a chuck 2 is arranged facing toward a through hole 6 of a fiber guide 1 in the fiber fixing device according to the second embodiment 2. In other words, the chuck 2 is arranged reversely in comparison to the first embodiment.

In the fiber fixing device according to the second embodiment, further, temporary retaining parts 16 are provided on the back of the pair of grasp parts 10 of the chuck 2, in order to retain an elastic tubular body 3 on the chuck 2 in an initial stage of assembling.

Third Embodiment

Figure 10:
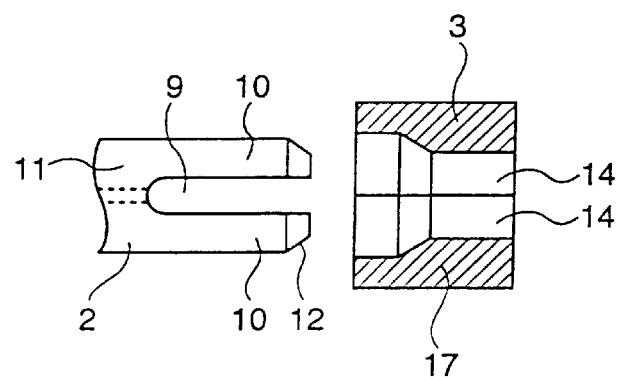
FIG. 10 is a partially enlarged sectional view showing a fiber fixing device according to a third embodiment of the present invention.

FIG. 10 is an enlarged partial sectional view showing a fiber fixing device according to a third embodiment of the present invention. While in the first and second embodiments the chuck 2 has a pair of grasp parts 10 with a slightly increased diameter relative to the coupling part 11, in the third embodiment a pair of grasp parts 10 have an identical in diameter as a coupling part 11 of a chuck 2, and an elastic tubular body 3 is provided with a diametrically reduced part 17 having a smaller inner diameter than the outer diameter of the pair of grasp parts 10.

When the chuck 2 is forcibly fitted into the elastic tubular body 3 also in this embodiment, the pair of grasp parts 10 are inserted in the diametrically reduced part 17, whereby the diametrically reduced part 17 becomes somewhat expanded while the grasp parts 10 are squeezed together, so that an optical fiber 5 can be retained by the pair of grasp parts 10.

Alternatively, another chuck 2 (not shown) having a pair of grasp parts 10 with an increased diameter over at least a portion thereof can be combined with the elastic tubular body 3 having the diametrically reduced part 17.

Fourth Embodiment

Figure 11:
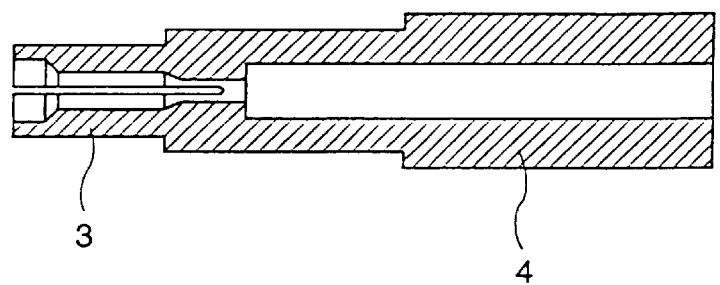
FIG. 11 is a sectional view showing an elastic tubular body employed for a fiber fixing device according to a fourth embodiment of the present invention.

FIG. 11 is a sectional view showing an elastic tubular body 3 which is employed for a fiber fixing device according to a fourth embodiment of the present invention. Referring to FIG. 11, a pressure pipe 4 is integrally provided on a rear portion of the elastic tubular body 3 according to this embodiment. Due to this structure, the number of components can be reduced.

Fifth Embodiment

Figure 12:
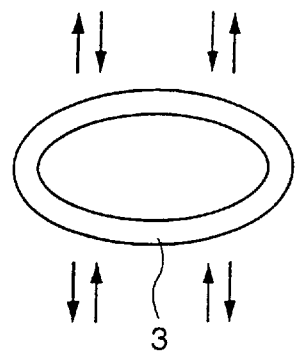
FIG. 12 is a sectional view showing an elastic tubular body employed for a fiber fixing device according to a fifth embodiment of the present invention.

FIG. 12 is a sectional view showing an elastic tubular body 3 which is employed for a fiber fixing device according to a fifth embodiment of the present invention. While the pipe-shaped tubular body 3 having a substantially C-shaped section is employed in each of the aforementioned embodiments, the elastic tubular body 3 is in the form of an elliptic ring or an elliptic cylinder without a slit in this embodiment. Such a tubular body 3 is also pushed over and into contact with a pair of grasp parts 10 of a chuck 2, so that it is expanded into a state close to a circular shape, for generating an elastic restoring force (retaining force) acting on the grasp parts following such expansion.

Sixth Embodiment

Figure 13:
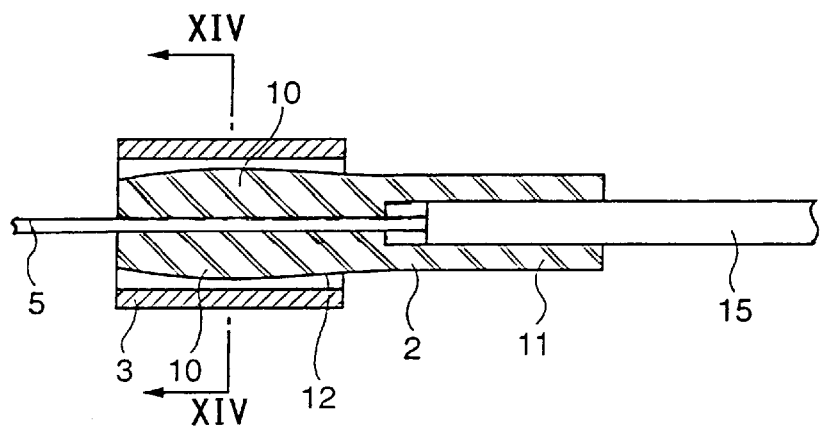
FIG. 13 is a partially fragmented sectional view showing a fiber fixing device according to a sixth embodiment of the present invention.
Figure 14:
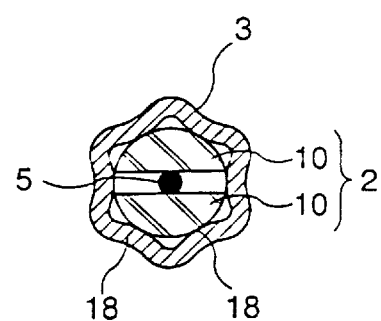
FIG. 14 is a sectional view taken along the line Y—Y in FIG. 13.

FIGS. 13 and 14 are adapted to illustrate a fiber fixing device according to a sixth embodiment. In more detail, FIG. 13 is a sectional view showing a principal part of the fiber fixing device, and FIG. 14 is a sectional view taken along the line XIV—XIV in FIG. 13. Referring to FIG. 13, an elastic tubular body 3 in this embodiment has a polygonal shape (hexagonal shape in this embodiment), and portions corresponding to sides or flutes of the polygon are inwardly convexly bent. The elastic tubular body 3 shown in FIG. 14 has a number of such bent portions 18. This elastic tubular body 3 is pushed over and comes into contact with a pair of grasp parts 10 of a chuck 2 as shown in FIG. 13, whereby the bent portions 18 of the elastic tubular body 3 are outwardly expanded to cause a pressing force applied to the pair of grasp parts 10 by an elastic restoring force of the expanded tubular body 3, for elastically retaining an optical fiber 5 between the grasp parts 10.

As hereinabove described, the inventive fiber fixing device for a lightguide comprises the elastic tubular body which radially inwardly presses the grasp parts by its restoring force after it is elastically expanded outwardly in the radial direction and fitted around the grasp parts of the chuck, whereby the fiber fixing device can elastically grasp the optical fiber with the grasp parts. Thus, internal stress is hardly caused in the optical fiber due to a difference in thermal expansion coefficients between an adhesive and the optical fiber, or due to dimensional dispersion, dissimilarly to the conventional fiber fixing device wherein the optical fiber member is fixed with an adhesive or by directly fixing the same by caulking or crimping. Consequently, neither the optical characteristics are hindered nor the life of the optical fiber is shortened.

If the inventive fiber fixing device is tested after fixing a linear lightguide, and the assembly is determined to be defective, the elastic tubular body can be detached from the chuck so that the fiber fixing device can be reused for re-assembling. Thus, the production yield is extremely economically improved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A fiber fixing device for a linear lightguide, comprising:

a cylindrical chuck including a hollow space along an axis of said chuck for receiving an optical fiber, a grasp part for grasping said optical fiber received in said hollow space, and a coupling part coupling said grasp part, wherein said grasp part has a first outer diameter larger than a second outer diameter of another portion of said chuck, and said chuck further includes a sloping shoulder transitioning between said first outer diameter of said grasp part and said second outer diameter of said another portion;

an elastic tubular body that is fitted around said grasp part of said chuck after having been elastically expanded outwardly, such that said elastic tubular body exerts a radially inwardly directed elastic restoring force onto said chuck whereby said grasp part grasps said optical fiber; and a fiber guide, having a cavity receiving said chuck and said elastic tubular body therein and a hole for receiving a forward end portion of said optical fiber therein, and including a stopper part in said cavity arranged to be struck by and in contact with a forward end portion of said chuck, and being adapted for fitting said elastic tubular body onto said grasp part of said chuck by bringing said forward end portion of said chuck into contact with said stopper part and pushing said elastic tubular body toward said stopper part from said another portion of said chuck, over said sloping shoulder and onto said grasp part of said chuck.

2. The fiber fixing device in accordance with claim 1, wherein said elastic tubular body has a substantially C-shaped cross-section.

3. The fiber fixing device in accordance with claim 1, wherein said another portion of said chuck having said second outer diameter adjoins and is interposed between said grasp part and said coupling part.

4. The fiber fixing device in accordance with claim 3, wherein
said grasp part is provided on a forward end portion of said chuck.

5. The fiber fixing device in accordance with claim 3, wherein said coupling part has the same said second outer diameter as said another portion.

6. The fiber fixing device in accordance with claim 1, wherein said grasp part consists of a pair of members having flat opposite facing surfaces extending entirely thereacross.

7. The fiber fixing device in accordance with claim 6, wherein said pair of members respectively have substantially semicircular sectional shapes.

8. The fiber fixing device in accordance with claim 1, wherein
said coupling part is provided on a forward end portion of said chuck.

9. The fiber fixing device in accordance with claim 8, wherein said another portion and said sloping shoulder of said chuck are arranged on a side of said grasp part opposite said coupling part.

10. The fiber fixing device in accordance with claim 1, further comprising a pressure pipe for pushing said elastic tubular body toward said stopper part.

11. The fiber fixing device in accordance with claim 10, wherein
said pressure pipe and said elastic tubular body are integrally formed with each other.

12. The fiber fixing device in accordance with claim 1, wherein said elastic tubular body has a substantially elliptic sectional shape without a longitudinal slot therein.

13. The fiber fixing device in accordance with claim 1, wherein said elastic tubular body has a polygonal sectional shape.

14. The fiber fixing device in accordance with claim 1, excluding any adhesive for fixing the optical fiber.

15. A device for securing an optical fiber, comprising:
a chuck including a plurality of grasping jaws that each have a free end and a coupled end, and including a coupling body integrally connected to and coupling together said coupled ends of said grasping jaws, with a hole extending along an axis of said chuck through said coupling body and at least one slit extending along said axis between said grasping jaws, wherein said hole and said slit are adapted to receive the optical fiber therein extending along said axis, wherein said grasping jaws include a first portion with a relatively larger outer diameter and a second portion with a relatively smaller outer diameter and a sloping shoulder between said first and second portions, and wherein said grasping jaws are deflectable toward one another from an initial unassembled state in which the optical fiber may pass loosely through said slit between said grasping jaws to a final assembled state in which at least respective grasping portions of said grasping jaws adjacent said free ends thereof are pressed against the optical fiber for securely grasping the optical fiber, and an elastic tubular body that is elastically expandable in a radial direction and that has an inner diameter in an initial unexpanded state that is less than said relatively larger outer diameter of said first portion of said grasping jaws in said initial unassembled state, wherein said elastic tubular body is adapted to be elastically expanded into an expanded state in which said inner diameter thereof is enlarged and to be fitted directly onto and around said first portion of said grasping jaws whereby an elastic restoring force of said expanded elastic tubular body acts radially inwardly on said grasping jaws to deflect said grasping jaws from said initial unassembled state to said final assembled state in which said grasping portions of said grasping jaws are pressed against and securely grasp the optical fiber.

16. The device according to claim 15, further in combination with said optical fiber being received in said hole and said slit and extending along said axis, wherein said elastic tubular body is fitted directly onto and around said first portion of said grasping jaws and elastically presses said grasping jaws radially inwardly so that said grasping portions of said grasping jaws are pressed against and securely grasp the optical fiber.

17. The device according to claim 16, wherein said elastic tubular body is arranged on said grasping jaws directly radially outwardly around said first portion of said grasping portions, whereby a radially inward pressing force exerted by said elastic tubular body is effective directly radially from said elastic tubular body through said grasping portions of said grasping jaws onto said optical fiber.

18. The device according to claim 16, excluding any adhesive for fixing said optical fiber.

19. The device according to claim 15, wherein said elastic tubular body comprises a circular cylindrical shell having a slot extending entirely longitudinally therealong.

20. The device according to claim 15, wherein said elastic tubular body comprises a hollow tubular sleeve having a polygonal fluted sectional shape.

21. The device according to claim 15, wherein said elastic tubular body comprises a cylindrical sleeve with a stepped inner bore including a first bore portion having a relatively larger inner diameter and a second bore portion having a relatively smaller inner diameter with a sloped transition between said first bore portion and said second bore portion.

22. The device according to claim 15, wherein said elastic tubular body comprises a continuous sleeve having an elliptical sectional shape without a longitudinal slit.

23. The device according to claim 15, wherein said chuck includes two of said jaws, said grasping portions respectively comprise flat jaw faces adapted to be pressed against the optical fiber, and each one of said jaws has a respective semi-circular cross-sectional shape.

24. The device according to claim 15, wherein said second portion of said grasping jaws adjoins said coupling body, and said coupling body has the same said relatively smaller outer diameter as said second portion of said grasping jaws being smaller than said relatively larger outer diameter of said first portion of said grasping jaws.

* * * * *

UNITED STATES PATENT AND TRADEMARK OFFICE
CERTIFICATE OF CORRECTION

PATENT NO. : 6,018,606
DATED : Jan. 25, 2000
INVENTOR(S) : Sogabe et al.

It is certified that error appears in the above-identified patent and that said Letters Patent is hereby corrected as shown below:

Title Page: under "References Cited
U. S. PATENT DOCUMENTS":
line 11, after "4,902,090  2/1990 Tanaka", insert --et al.--;

Col. 4, line 5, after "parts", delete "or shoulder";
line 6, after "parts" insert --or shoulder--;
line 7, after "and", delete ",";
line 48, before "or", replace "separate" by --separated--;

Col. 6, line 10, after "in", insert --particular--;

Col. 7, line 19, after "on", replace "a" by --said--;

Col. 8, line 32, after "said", insert --first portion of said--;
line 33, after "said", delete "first portion of said".

Signed and Sealed this

Thirteenth Day of February, 2001

NICHOLAS P. GODICI

Attest:

Attesting Officer                    Acting Director of the United States Patent and Trademark Office